US008436638B2

(12) United States Patent
Ebbers et al.

(10) Patent No.: US 8,436,638 B2
(45) Date of Patent: May 7, 2013

(54) SWITCH TO PERFORM NON-DESTRUCTIVE AND SECURE DISABLEMENT OF IC FUNCTIONALITY UTILIZING MEMS AND METHOD THEREOF

(75) Inventors: Jonathan Ebbers, South Burlington, VT (US); Kenneth J. Goodnow, Essex Junction, VT (US); Stephen G. Shuma, Underhill, VT (US); Peter A. Twombly, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/964,764

(22) Filed: Dec. 10, 2010

(65) Prior Publication Data
US 2012/0146684 A1 Jun. 14, 2012

(51) Int. Cl.
*H03K 19/00* (2006.01)
(52) U.S. Cl.
USPC ................................. 326/8; 326/9; 326/38
(58) Field of Classification Search .................. 326/8
See application file for complete search history.

(56) References Cited

U.S. PATENT DOCUMENTS

| | | |
|---|---|---|
| 6,246,970 B1 | 6/2001 | Silverbrook et al. |
| 6,321,654 B1 | 11/2001 | Robinson |
| 6,514,781 B2 | 2/2003 | Chang et al. |
| 6,549,107 B2 | 4/2003 | Lim et al. |
| 6,625,047 B2 | 9/2003 | Coleman, Jr. |
| 6,804,552 B2 * | 10/2004 | Thompson et al. ............... 607/2 |
| 6,833,597 B2 | 12/2004 | Blasko, III |
| 6,906,436 B2 | 6/2005 | Jenson et al. |
| 7,045,843 B2 | 5/2006 | Goto et al. |
| 7,151,425 B2 | 12/2006 | Park et al. |
| 7,482,929 B2 | 1/2009 | Bowers et al. |
| 7,831,935 B2 * | 11/2010 | Bernstein et al. ............. 716/102 |
| 2010/0033299 A1 | 2/2010 | Davis |
| 2010/0155204 A1 | 6/2010 | Receveur et al. |
| 2010/0225380 A1 | 9/2010 | Hsu et al. |

OTHER PUBLICATIONS

Boyle, et al., "MEMS Bistable Clamp With Electrical Locking and Release", Proc. 15th Micromechanics Workshop, Sep. 5-7, 2004, 4 pages.
Chalmers, "relay races", Mechanical Engineering Magazine Online, Jan. 2001, http://www.memagazine.org/backissues/membersonly/jan01/features/reraces/reraces.html, 8 pages.
International Search Report for International Application No. PCT/US2011/061420 dated Mar. 22, 2012, 2 pages.

* cited by examiner

Primary Examiner — Jany Tran
(74) Attorney, Agent, or Firm — David Cain; Roberts Mlotkowski Safran & Cole, P.C.

(57) ABSTRACT

Structures and methods are provided for performing non-destructive and secure disablement of integrated circuit (IC) functionality. A structure for enabling non-destructive and secure disablement and re-enablement of the IC includes a micro-electrical mechanical structure (MEMS) initially set to a chip enable state. The structure also includes an activation circuit operable to set the MEMS device to an error state based on a detected predetermined condition of the IC. The IC is disabled when the MEMS device is in the error state.

19 Claims, 4 Drawing Sheets

SWITCH TO PERFORM NON-DESTRUCTIVE AND SECURE DISABLEMENT OF IC FUNCTIONALITY UTILIZING MEMS AND METHOD THEREOF

FIELD OF THE INVENTION

The invention relates to integrated circuits (IC) and, more particularly, to structures and methods for performing non-destructive and secure disablement of IC functionality.

BACKGROUND

There are several known solutions to turn off full or partial functionality of an integrated circuit (IC). One of these known solutions involves a software approach, where, for example, a computer program disables an IC until a special data sequence is input into the IC via the computer program. Another known solution to turn off an IC involves a hardware approach, where, for instance, electronic fuses are embedded in the IC and are blown to disable the IC. A third known solution is to embed an electronically-erasable random-access memory (RAM) in an IC.

However, each of these known solutions has shortcomings in that they can be tampered with or permanently disable an IC. For example, a chip that uses the software approach may be rendered ineffective if a computer program is discovered, hacked into, and altered, or if encrypted communication between the computer program and the chip is intercepted, deciphered, and altered. An IC that utilizes the hardware approach is permanently disabled after, for example, an electronic fuse is blown to disable the IC, rendering the IC useless. Using multiple electronic fuses may allow the IC to be disabled more times, but this method is also area-intensive with respect to the IC and still does not avoid permanent disablement of the IC in the long-term. In another hardware-oriented example, using registers may be insecure if they are discovered and saved states in the registers are altered. Lastly, an electronically-erasable RAM may be affected by a high-radiation environment and alpha particles, for instance.

Accordingly, there exists a need in the art to overcome the deficiencies and limitations described hereinabove.

SUMMARY

In a first aspect of the invention, a structure for enabling non-destructive and secure disablement and re-enablement of the integrated circuit (IC) includes a micro-electrical mechanical structure (MEMS) initially set to a chip enable state. The structure also includes an activation circuit operable to set the MEMS device to an error state based on a detected predetermined condition of the IC. The IC is disabled when the MEMS device is in the error state.

In another aspect of the invention, a method for enabling non-destructive and secure disablement and re-enablement of an IC includes setting a MEMS initially to a chip enable state. The method also includes setting the MEMS to an error state based on a detected predetermined condition of the IC. The IC is disabled when the MEMS is in the error state.

In yet another aspect of the invention, a method for enabling non-destructive and secure disablement and re-enablement of an IC includes setting a MEMS initially to a chip enable state and receiving a condition notification signal that indicates a detected predetermined condition of the IC. The method also includes setting the MEMS to an error state based on the condition notification signal, where the IC is disabled when the MEMS is in the error state. An override signal is asserted to at least one of the MEMS and an activation circuit. The MEMS is reset to the chip enable state based on the override signal, where the IC is re-enabled when the MEMS is in the chip enable state.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to integrated circuits (IC) and, more particularly, to structures and methods for performing non-destructive and secure disablement of IC functionality. More specifically, the invention is directed to a structure that monitors IC activity for predetermined conditions and utilizes a micro-electrical mechanical structure (MEMS) to provide a secure, non-destructive, and radiation-hardened mechanism to disable functionality of the IC upon detection of one of the conditions. In addition, the structure provides a secure method to reset the MEMS and re-enable functionality of the IC.

In implementation, the structures of the present invention include a MEMS and MEMS control logic that receives a signal indicating that a predetermined condition has been detected. In embodiments, upon detection of the predetermined condition, the MEMS can disable the IC. The predetermined condition may include, for example, detection of unauthorized activity. In embodiments, the present invention may include a memory that persists when the IC is disabled and a power is removed.

In operation, when a predetermined condition is detected, the MEMS is moved into an error state, disabling the functionality of the IC. Advantageously, though, the MEMS can be moved back into a state that enables the functionality of the IC after the expiration of the predetermined condition, or through a reactivation sequence of events. In embodiments, this may be performed by powering an external pin of the IC, or transferring an override signal through the pin to the MEMS and/or the MEMS control logic. To provide the override signal, for instance, the pin may be placed in a special socket of another IC or be probed by equipment.

Advantageously, the invention allows the disablement and subsequent re-enablement of an IC in a secure fashion by not allowing unauthorized users to control the MEMS. Further, the invention allows the disablement and subsequent re-enablement of an IC without having to permanently disable the IC. In addition, the invention utilizes a MEMS that is not affected by a high-radiation environment and alpha particles, and utilizes a radiation-hardened IC, for example. Also, the structures of the present invention increases the available chip real estate for other uses in comparison to other, more destructive, structures, and IC functionality can be disabled an unlimited amount of times since the MEMS can be switched on and off in a non-destructive manner.

Figure 1A:
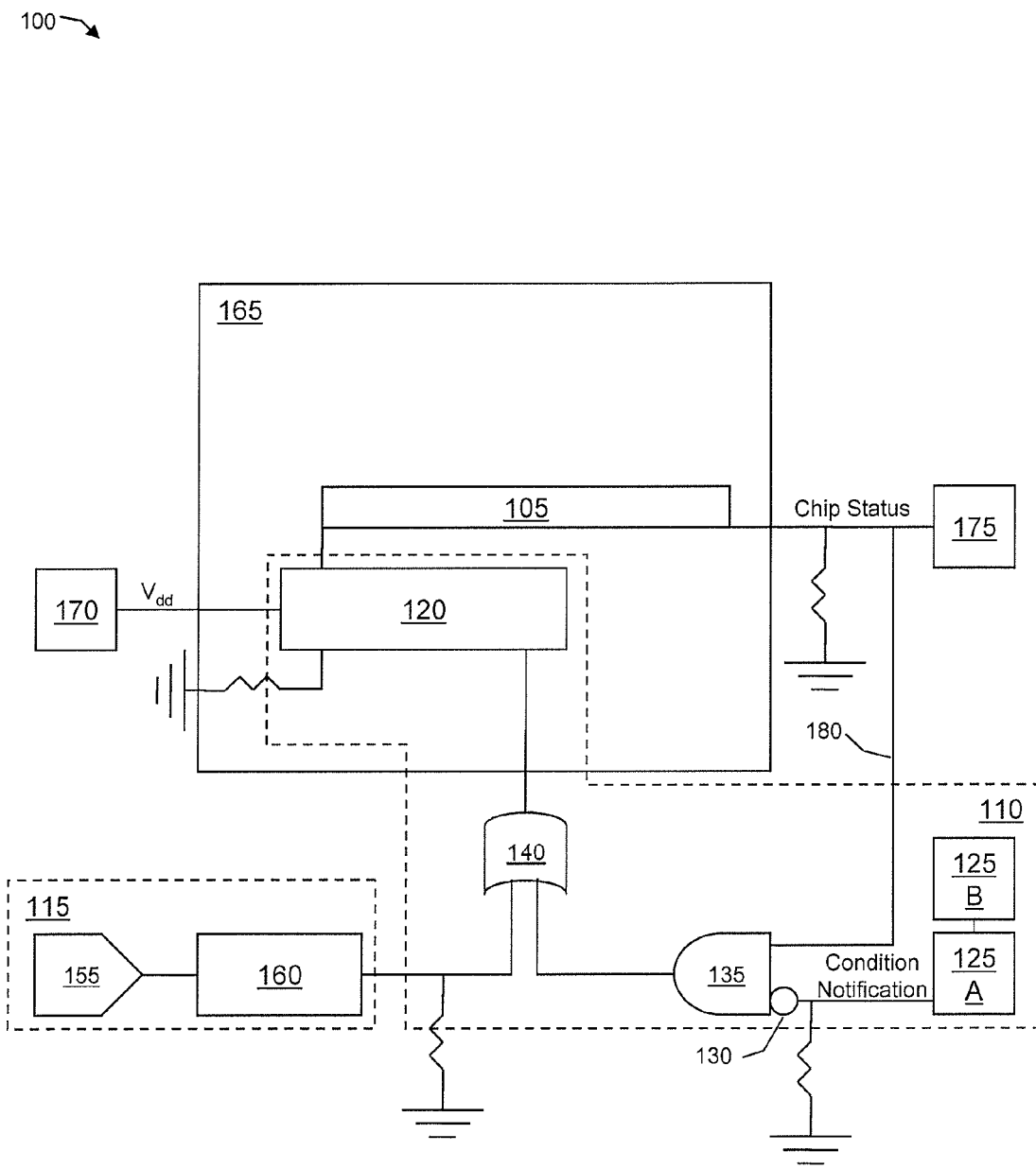
FIG. 1A is an exemplary schematic of a structure including a micro-electrical mechanical structure (MEMS) in a chip enable state in accordance with aspects of the invention.

FIG. 1A is an exemplary schematic of a structure 100 including a MEMS 105 in a chip enable state in accordance with aspects of the invention. More specifically, a state of the MEMS 105 is related to a state of an IC, and the chip enable state indicates that the IC is in a functional state. In embodiments, the MEMS 105 may be a cantilever beam, a rotating gear (FIGS. 2A-2B), or any other MEMS device known in the art that may be switched between different states. In embodiments, the MEMS 105 may be an active or passive MEMS, and may move with or without voltage or power applied thereto.

The structure 100 further includes an activation circuit 110 and an override circuit 115. In embodiments, the activation circuit 110 may include a MEMS control module 120, a condition detection module 125A including a memory or circuitry 125B, an inverter gate 130, an AND gate 135, and an OR gate 140. In accordance with aspects of the invention, and as discussed in more detail below, the activation circuit 110 is operable to activate (e.g., move) the MEMS 105. In embodiments, the override circuit 115 may include an input/output (I/O) pad or pin 155 and an electrostatic discharge (ESD) module 160. In accordance with aspects of the invention, and as discussed in more detail below, the override circuit 115 is operable to override (e.g., reset) an activation of the MEMS 105. In embodiments, the structure 100 may be implemented in the related IC (e.g., embedded in the IC) or implemented external to the IC (e.g., as a separate structure or circuit) to control the IC in accordance with aspects of the present invention.

In embodiments, the MEMS control module 120 may control the MEMS 105, specifically, the movement of the MEMS 105. The MEMS control module 120 and the MEMS 105 may be in a voltage island 165, where they are isolated from receiving voltages, except for a power supply voltage $V_{dd}$ from a power supply 170. In embodiments, the power supply 170 may be implemented in the structure 100 or in the related IC. The MEMS control module 120 may connect the power supply voltage $V_{dd}$ to the MEMS 105.

In the chip enable state, the MEMS 105 provides a closed circuit between the power supply 170, the MEMS control module 120, and a component 175. More specifically, in the chip enable state, the power supply voltage $V_{dd}$ is transferred through the MEMS 105 to the component 175 as a chip status signal ("Chip Status"), indicating that the MEMS 105 is in the chip enable state and that the related IC is in the functional state. In embodiments, the component 175 may include at least one circuit or module of the IC or another IC, and the chip status signal indicates to the at least one circuit of the IC or the another IC that the IC is in the functional state. In embodiments, the component 175 may include another structure that is the same as the structure 100.

In the chip enable state, the chip status signal is also transferred through the MEMS 105 to the activation circuit 110 via a feedback loop 180, particularly, a wire that connects the MEMS 105 to the activation circuit 110, forming a closed circuit between the components. In the activation circuit 110, the chip status signal is input into the AND gate 135. In embodiments, a condition notification signal ("Condition Notification") may also be input into the AND gate 135 via the inverter gate 130. Initially, the condition detection module 125A sets the condition notification signal to a low-logic voltage level signal (e.g., a binary 0 signal). In embodiments, the condition detection module 125A may be implemented in the structure 100 as shown, in the IC but external to the structure 100, or in another IC.

By inputting the signal into the inverter gate 130, the low condition notification signal is inverted into a high-logic voltage level signal (e.g., a binary 1 signal), and input into the AND gate 135 with the chip status signal. This results in a high-logic voltage level signal being input into the OR gate 140 and into the MEMS control module 120. The high-logic voltage level signal indicates to the MEMS control module 120 that the IC should be functional, and hence ensures that the MEMS 105 is in the chip enable state.

Figure 1B:
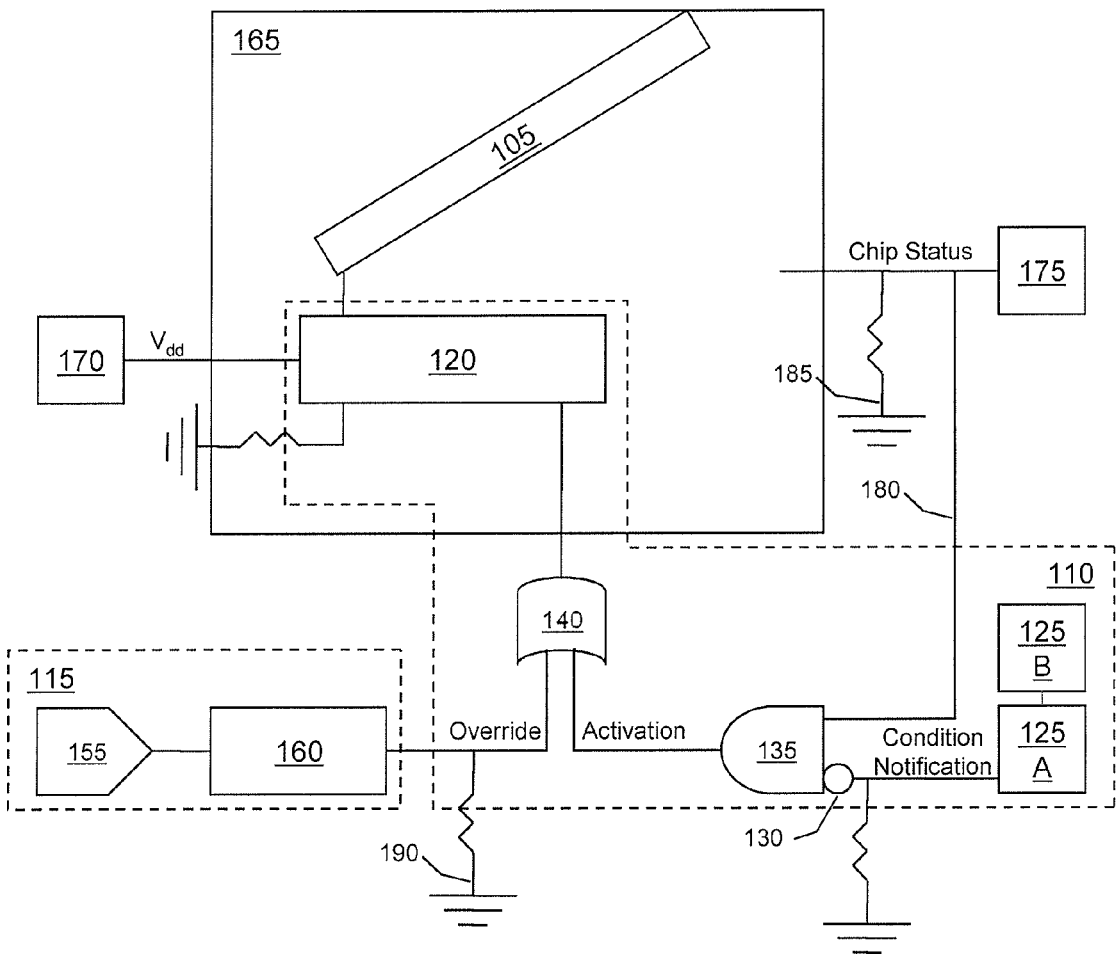
FIG. 1B is the exemplary schematic of FIG. 1A where the MEMS is in an error state in accordance with aspects of the invention.

FIG. 1B is the exemplary schematic the MEMS 105 is in an error state in accordance with aspects of the invention. More specifically, the error state indicates that the IC is in a disabled or non-functional state. In the error state, the MEMS 105 is moved to an open position with respect to the component 175 and the activation circuit 110. That is, the MEMS 105 does not provide a closed circuit between the power supply 170, the MEMS control module 120, the component 175, and the activation circuit 110.

Consequently, the power supply voltage $V_{dd}$ is no longer transferred through the MEMS 105 to the component 175 and the activation circuit 110 as the chip status signal. Instead, the chip status signal is set to a low-logic voltage level signal, via a pull-down mechanism 185, that is transferred to the activation circuit 110 to keep the chip status signal low, and also output to the component 175 to indicate to the component 175 that the MEMS 105 is in the error state and that the IC is in the disabled state. For example, the component 175 may include a circuit in the IC that actually disables the IC and/or its functionality based on the low chip status signal. In another example, the component 175 may be another IC including a structure that is the same as the structure 100, to move its MEMS into an error state based on the low chip status signal.

The process of moving the MEMS 105 into the error state begins when the condition detection module 125A sets the condition notification signal (e.g., an error signal) to a high-logic voltage level signal. The condition notification signal may be set based on various predetermined conditions that would trigger the IC to be in a disabled state. For example, in embodiments, the condition notification signal may be set to high when the condition detection module 125A detects a condition such as, for example, any the following, non-limiting conditions on the IC:
  a copyright violation;
  a connection to an unauthorized network;
  a user entering incorrect authentication information (e.g., username and password) multiple times;
  a breach of security;
  a timeout mechanism;
  a requirement to shut down a hard drive due to an event (e.g., an earthquake);
  a power outage; and/or
  an electro-static discharge (ESD) event (e.g., a momentary, unwanted current).

In embodiments, another structure that is the same as the structure 100 may set the condition notification signal instead of the condition detection module 125A. For example, the another structure may output its chip status signal as the condition notification signal in the structure 100. In this case, the chip status signal of the another structure may indicate that the MEMS of the another structure is in an error state (e.g., a condition), so the MEMS 105 of the structure 100 should also be in the error state.

In embodiments, the condition detection module 125A may include the memory or circuitry 125B that is programmable by a user to include the predetermined conditions, such as those above, that would set the condition notification signal to high. In addition, the memory or circuitry 125B may be used to store, for example, the chip status signal, the condition notification signal, and other data that may need to persist even though the IC is disabled and/or power is removed.

When the condition notification signal is set to high due to one of the detected conditions, the high condition notification signal is inverted at the inverter gate 130, and the AND gate 135 outputs a low-logic voltage level signal, or an activation signal ("Activation"), via the OR gate 140 into the MEMS control module 120. Accordingly, a low-logic voltage level signal from the OR gate 140 indicates to the MEMS control module 120 that a condition (e.g., a user copyright violation) has occurred and that the IC and/or its functionality should be disabled. At such indication, the MEMS control module 120 moves (e.g., activates) the MEMS 105 to the error state, e.g., an open position with respect to the component 175 and the activation circuit 110. Note that during this disabling process, the override signal is not active, and the other input to the OR gate 140 is held at a low-logic voltage level via a pull-down mechanism 190.

Advantageously, the MEMS 105 may be reset, e.g., moved into the chip enable state, by the I/O pad or pin 155 and the ESD module 160, which may constitute the override circuit 115. More specifically, in embodiments, the I/O pin 155 may be an external pin of the IC that fits into a socket of another IC. In embodiments, the I/O pin 155 may assert an override signal ("Override") that resets the MEMS 105.

In embodiments, the I/O pin 155 may reset the MEMS 105 when the IC is connected into a socket of another IC that allows an override signal to be asserted. The override signal may be transferred to the MEMS 105 through the OR gate 140 and the MEMS control module 120 such that the MEMS 105 physically moves back into the chip enable state. Alternatively, the I/O pin 155 may be connected to the MEMS control module 120 and may transfer the override signal (e.g., a high-logic voltage level signal) to the MEMS control module 120, which resets the MEMS 105. For security purposes, the I/O pin 155 may be internal (e.g., in the IC) and/or inaccessible to outside tampering except via special equipment and/or the special socket of another IC.

In embodiments, the I/O pin 155 may receive the override signal internally from a component in the IC, such as a memory and/or a processor of the IC. The components and methods used to supply the override signal may depend on security requirements for the IC. In embodiments, the override circuit 115 may include a timer that delays the reset of the MEMS 105 (e.g., a reactivation of the voltage island 165) for a predetermined period of time and/or until an occurrence of an event. This timer may, for example, be integral in the MEMS control module 120. In operation, when the override signal is asserted, the MEMS 105 moves back to the chip enable state, or the closed position with respect to the component 175 and the activation circuit 110, and normal functionality of the IC is resumed.

In embodiments, the ESD module 160 may protect the I/O pin 155 and/or the OR gate 140 from an ESD event in the IC at the I/O pin 155. For example, an ESD event may cause the chip status signal, the condition notification signal, and/or the override signal to change, and thus the MEMS 105 to change, when they were not meant to change. Thus, the ESD module 160 may protect the structure 100 from errors in the chip status signal, the condition notification signal, and/or the override signal during an ESD event. For instance, if there is an ESD event at the I/O pin 155, the ESD module 160 may shunt a current from the I/O pin 155 to ground, to keep the ESD event from erroneously changing the condition of the MEMS 105. The ESD module 160 may also protect the components of the structure 100 (e.g., the OR gate 140) from damage due to an ESD event.

Figure 2A:
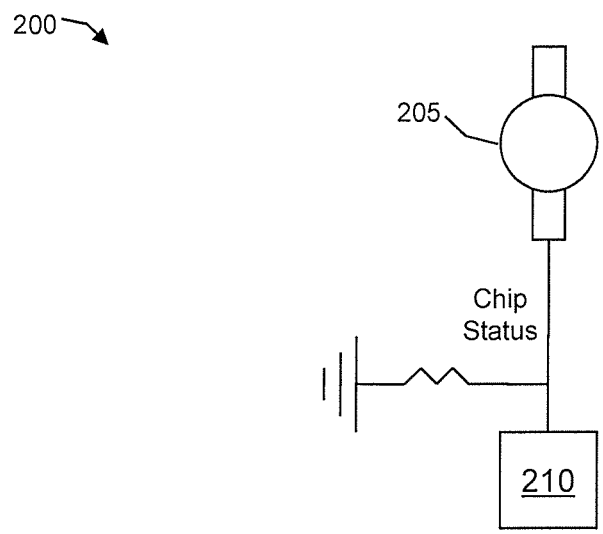
FIG. 2A is another exemplary schematic of a structure including a MEMS in a chip enable state in accordance with aspects of the invention.

FIG. 2A is another exemplary schematic of a structure 200 including a MEMS 205 in a chip enable state in accordance with aspects of the invention. The chip enable state indicates that an IC related to the MEMS 205 is in a functional state. In embodiments, the MEMS 205 may be a rotating gear, and is in a closed position with respect to a component 210. Accordingly, the MEMS 205 forms a closed circuit with the component 210 and transfers a chip status signal ("Chip Status") to the component 210 that indicates to the component 210 that the MEMS 205 is in the chip enable state and that the IC is in the functional state.

Figure 2B:
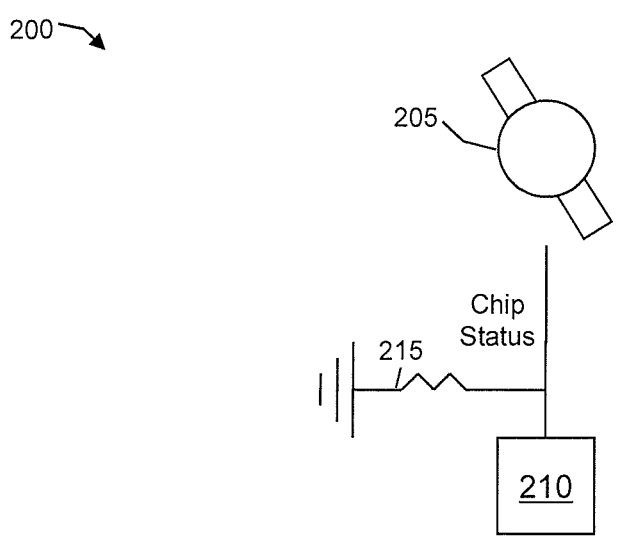
FIG. 2B is the exemplary schematic of FIG. 2A where the MEMS is in an error state in accordance with aspects of the invention.

FIG. 2B is the exemplary schematic of FIG. 2A where the MEMS 205 is in an error state in accordance with aspects of the invention. The error state indicates that the related IC is in a disabled state. The MEMS 205 is moved into an open position with respect to the component 210, and thus is no longer forming a closed circuit with the component 210 and transferring the chip status signal to the component 210. Instead, the chip status signal is set to a low-logic voltage level signal, via a pull-down mechanism 215, that indicates to the component 210 that the MEMS 205 is in the error state and that the IC is in the disabled state. In embodiments, the component 210 may include a circuit of the IC that disables the IC and/or its functionality based on the low chip status signal.

Figure 3:
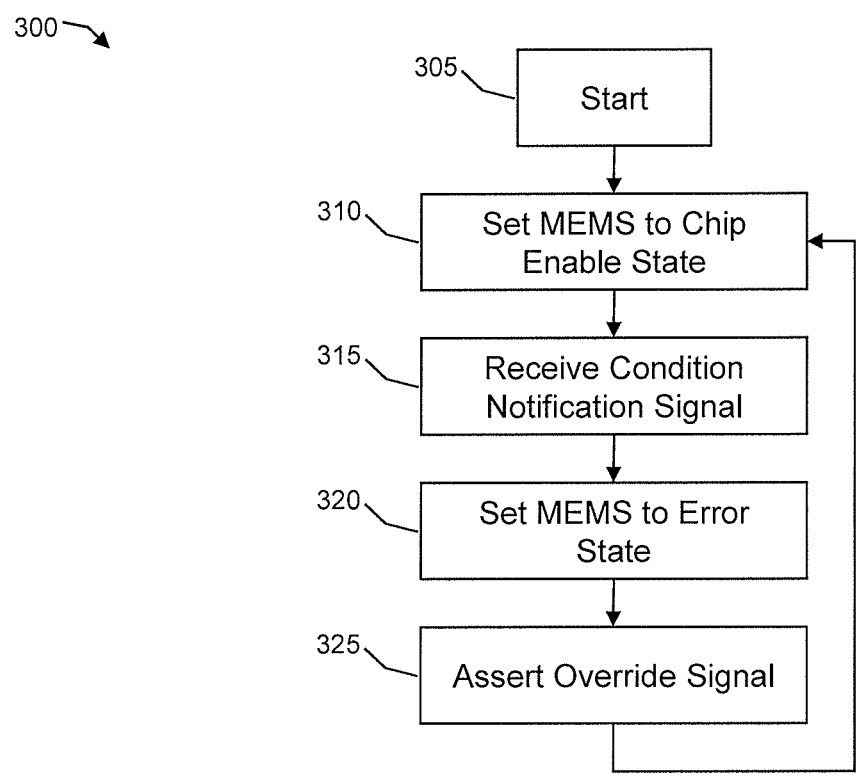
FIG. 3 is an exemplary flow diagram of a process of operating a MEMS in accordance with aspects of the invention.

FIG. 3 is an exemplary flow diagram 300 of a process of operating a MEMS (e.g., the MEMS 105 in FIG. 1) in accordance with aspects of the invention. At step 305, the process starts. At step 310, an activation circuit (e.g., the activation circuit 110) and/or an override circuit (e.g., the override circuit 115) sets the MEMS to a chip enable state and a closed position with respect to a component (e.g., the component 175) and the activation circuit. At step 315, the activation circuit receives a high condition notification signal from a condition detection module (e.g., the condition detection module 125A) or another IC. For example, the high condition notification signal may be triggered when the condition detection module detects a user copyright violation.

At step 320, the activation circuit sets the MEMS to an error state and an open position with respect to the component and the activation circuit. At step 325, the override circuit asserts an override signal onto the MEMS and/or a MEMS control module (e.g., the MEMS control module 120). For example, an I/O pin (e.g., the I/O pin 155) may assert the override signal when it is put into a socket of another IC. The process returns to step 310.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A structure for enabling non-destructive and secure disablement and re-enablement of an integrated circuit (IC), comprising:
   a micro-electrical mechanical structure (MEMS) initially set to a chip enable state; and
   an activation circuit operable to set the MEMS device to an error state based on a detected predetermined condition of the IC,
   wherein:
      the IC is disabled when the MEMS device is in the error state; and
      the activation circuit is operable to:
         receive a condition notification signal that indicates the detected predetermined condition of the IC; and
         set the MEMS to the error state based on the condition notification signal.

2. The structure of claim 1, wherein the activation circuit comprises a memory operable to store at least one predetermined condition of the IC that sets the MEMS to the error state.

3. The structure of claim 1, wherein the activation circuit generates a chip status signal that indicates whether the MEMS is in one of the chip enable state and the error state and outputs the chip status signal to at least one of the IC, a circuit in the IC, and another IC.

4. The structure of claim 1, wherein:
   in the enable state, the MEMS forms a closed circuit including a power supply, a control module, and a component; and
   in the error state, the MEMS breaks the closed circuit and disables the IC.

5. A structure for enabling non-destructive and secure disablement and re-enablement of an integrated circuit (IC), comprising:
   a micro-electrical mechanical structure (MEMS) initially set to a chip enable state; and
   an activation circuit operable to set the MEMS device to an error state based on a detected predetermined condition of the IC,
   wherein the IC is disabled when the MEMS device is in the error state;
   the structure further comprising:
      an override circuit operable to assert an override signal to at least one of the MEMS and the activation circuit, wherein the MEMS is reset to the chip enable state based on the override signal, and the IC is re-enabled when the MEMS is in the chip enable state.

6. The structure of claim 5, wherein the override circuit comprises:
   a pin of the IC operable to assert the override signal to the at least one of the MEMS and the activation circuit, wherein a socket of another IC operable to fit onto the pin and to allow the override signal to be asserted to the pin.

7. The structure of claim 5, wherein:
   the MEMS is contained in a voltage island that receives a power supply voltage in the chip enable state; and
   the override circuit comprises a timer that delays a reactivation of the voltage island for at least one of a predetermined period of time and until an occurrence of an event.

8. The structure of claim 5, further comprising an electrostatic discharge (ESD) module that protects the structure from errors in a chip status signal, the condition notification signal, and the override signal during an ESD event.

9. A method for enabling non-destructive and secure disablement and re-enablement of an integrated circuit (IC), comprising:
   setting a micro-electrical mechanical structure (MEMS) initially to a chip enable state; and
   setting the MEMS to an error state based on a detected predetermined condition of the IC,
   wherein the IC is disabled when the MEMS is in the error state,
   the method further comprising:
      receiving a condition notification signal that indicates the detected predetermined condition of the IC; and
      setting the MEMS to the error state based on the condition notification signal.

10. The method of claim 9, storing at least one predetermined condition of the IC that sets the MEMS device to the error state.

11. The method of claim 9, further comprising:
   generating a chip status signal that indicates whether the MEMS is in one of the chip enable state and the error state; and
   outputting the chip status signal to at least one of the IC, a circuit in the IC, and another IC.

12. A method for enabling non-destructive and secure disablement and re-enablement of an integrated circuit (IC), comprising:
   setting a micro-electrical mechanical structure (MEMS) initially to a chip enable state; and
   setting the MEMS to an error state based on a detected predetermined condition of the IC,
   wherein the IC is disabled when the MEMS is in the error state,
   the method further comprising:
      asserting an override signal to at least one of the MEMS and an activation circuit; and
      resetting the MEMS to the chip enable state based on the override signal, wherein the IC is re-enabled when the MEMS is in the chip enable state.

13. The method of claim 12, further comprising allowing an override signal to be asserted on a pin of the IC fit into a socket of another IC.

14. The method of claim 12, wherein:
   the MEMS is contained in a voltage island that receives a power supply voltage in the chip enable state; and
   the resetting of the MEMS comprises delaying a reactivation of the voltage island for at least one of a predetermined period of time and until an occurrence of an event.

15. The method of claim 12, further comprising protecting from errors in a chip status signal, the condition notification signal, and the override signal during an ESD event.

16. A method for enabling non-destructive and secure disablement and re-enablement of an integrated circuit (IC), comprising:
- setting a micro-electrical mechanical structure (MEMS) initially to a chip enable state;
- receiving a condition notification signal that indicates a detected predetermined condition of the IC;
- setting the MEMS to an error state based on the condition notification signal, wherein the IC is disabled when the MEMS is in the error state;
- asserting an override signal to at least one of the MEMS and an activation circuit; and
- resetting the MEMS to the chip enable state based on the override signal, wherein the IC is re-enabled when the MEMS is in the chip enable state.

17. The method of claim 16, further comprising allowing an override signal to be asserted on a pin of the IC fit into a socket of another IC.

18. The method of claim 17, further comprising:
- generating a chip status signal that indicates whether the MEMS is in one of the chip enable state and the error state; and
- outputting the chip status signal to at least one of the IC, a circuit in the IC, and another IC.

19. The method of claim 18, further comprising protecting from errors in the chip status signal, the condition notification signal, and the override signal during an ESD event.

* * * * *